United States Patent [19]

Foedde et al.

[11] Patent Number: 5,670,441

[45] Date of Patent: Sep. 23, 1997

[54] BISMUTH CATALYSTS USEFUL FOR CURING OF CATAPHORETIC DEPOSITION COATING MATERIALS

[75] Inventors: Hartmut Foedde, Taunusstein; Markus A. Schafheutle, Hochheim; Achim Voelker, Wiesbaden; Susanne Wehner, Villmar; Klausjoerg Klein, Wuppertal, all of Germany

[73] Assignee: Hoechst Aktiengesellschaft, Frankfurt am Main, Germany

[21] Appl. No.: 493,994

[22] Filed: Jun. 23, 1995

[30] Foreign Application Priority Data

Jul. 1, 1994 [DE] Germany .................... 44 23 139.3

[51] Int. Cl.$^6$ .................... B01J 27/24; B01J 23/18; B01J 31/00
[52] U.S. Cl. .................... 502/200; 502/353; 502/250; 502/162; 502/167
[58] Field of Search .................... 502/150, 162, 502/167, 200, 353

[56] References Cited

U.S. PATENT DOCUMENTS

| | | | |
|---|---|---|---|
| 4,238,594 | 12/1980 | Pampouchidis | 528/69 |
| 4,761,212 | 8/1988 | Wanatabe et al. | 204/181.1 |
| 4,806,611 | 2/1989 | Hoenel et al. | 528/45 |
| 5,330,839 | 7/1994 | Yasuoka et al. | 428/413 |

FOREIGN PATENT DOCUMENTS

| | | |
|---|---|---|
| 0 509 437 | 10/1992 | European Pat. Off. . |
| 93/24578 | 12/1993 | WIPO . |

*Primary Examiner*—Glenn A. Caldarola
*Assistant Examiner*—Thuan D. Dang
*Attorney, Agent, or Firm*—Foley & Lardner

[57] ABSTRACT

Catalysts useful for the curing of, for example, cataphoretic deposition coating materials, including water-soluble bismuth compounds and an epoxy-amine adduct, the preparation of the bismuth compound involving acid being employed in a quantity such that there are less than 2 mol of dissociable protons per mole of bismuth.

18 Claims, No Drawings

BISMUTH CATALYSTS USEFUL FOR CURING OF CATAPHORETIC DEPOSITION COATING MATERIALS

BACKGROUND OF THE INVENTION

Dispersions of polymers can be employed as binders in aqueous coating systems. The coating film is cured by a crosslinking step. Where the crosslinking is based on transesterification, transamidation, or transurethanization, compounds of metals of groups IVb to VIa of the Periodic Table may act as catalysts.

For curing cationic coating binders which are employed, for example, in the cataphoretic electro-deposition ("CED") coating of motor vehicle bodies, use is frequently made of organic lead compounds and tin compounds, individually and as a mixture, as catalysts. For example, organic compounds of tetravalent tin such as dibutyltin oxide or dibutyltin dilaurate have been employed in this context. There have been attempts to replace these lead compounds and tin compounds, owing to their toxicity, by compounds of other metals.

The use of bismuth compounds as catalyst in such transurethanization reactions is known. The catalytic activity of bismuth compounds in the linking of urethane bonds in the reaction of isocyanates and hydroxy compounds is known, for example, from "Polyurethanes, Chemistry and Technology," High Polymers Vol. XVI, Part I, Wiley Interscience 1967, page 167. The good catalytic activity and corrosion-preventing effect of bismuth compounds are similar to those of lead compounds. Unlike the amphoteric oxides of lead and tin, however, the oxide of trivalent bismuth is strongly basic. Bismuth oxide dissolves in strong acids with the formation of the corresponding salts; on dilution or neutralization with water, however, bismuth hydroxide is deposited as a flocculent precipitate. The solutions of the salts of strong acids are markedly acidic, and on addition to cataphoretic deposition coating baths they shift the pH to below the permissible lower limit. The pH must accordingly be readjusted by addition of bases. If attempts are made to make the bismuth salt solution less strongly acidic, then bismuth hydroxide is precipitated, immediately or after a short time, leading to a fall in or disappearance of the catalytic activity, and the precipitate leads to surface defects in the coating film.

Austrian Patent AT 397 820 describes water-dilutable cationic coating binders which contain bismuth salts of aliphatic hydroxycarboxylic acids such as lactic acid and dimethylolpropionic acid. In this case the quantity of acid added to the binder is such that the bismuth salt is not hydrolyzed and then precipitated. Consequently the bismuth salt must be added in portions over a relatively long period such as 2 hours, and stirring is required for a further 6 hours thereafter. Only then can the bath liquid be prepared, by dilution with, for example, methoxypropanol to a solids content by mass of about 65%. This process does not make it possible to add a finished catalyst preparation to an otherwise complete CED bath liquid.

SUMMARY OF THE INVENTION

It is therefore an object of the present invention, to provide bismuth catalyst formulations which subsequently can be added to a CED bath liquid. In this context, the pH of the CED bath should be unchanged or changed so little by the bismuth catalyst formulation that it is possible to dispense with readjustment of the pH of the CED bath following addition of the catalyst.

It is also an object of the invention to provide methods of preparing such formulations and using such formulations, for example, as catalysts for the curing of coating materials.

In accordance with these and other objects, there has been provided a composition which is useful as a catalyst for the curing of cataphoretic deposition coating materials, which comprises an epoxy-amine adduct and a water-soluble bismuth compound, wherein the water-soluble bismuth compound is prepared by dissolving a basic bismuth compound in an aqueous acid, which acid is employed in a quantity such that there are 0.1 mol and less than 2 mol of dissociable protons per mole of bismuth.

In accordance with the invention, there also has been provided a process for the preparation of a composition which comprises a bismuth compound and is useful as a catalyst for the curing of cataphoretic deposition coating materials, comprising dissolving one or more basic bismuth compounds in an aqueous acid, and adding thereto a reaction product of at least one epoxide compound and at least one organic amine, wherein the acid is employed in a quantity such that less than 2 mol of dissociable protons are present per mole of bismuth.

In accordance with other objects of the invention, there are provided coating compositions containing the bismuth catalysts and substrates coated with such coating compositions.

Further objects features, and advantages of the present invention will become apparent from the detailed description of preferred embodiments that follows.

DETAILED DESCRIPTION OF THE PREFERRED EMBODIMENTS

The present invention provides compositions which comprise water-soluble bismuth compounds and which are suitable as catalysts for the curing of cataphoretic deposition coating materials, which compositions comprise an epoxy-amine adduct wherein the ratio of the number of bismuth atoms to the number of β-hydroxy amine groups of the epoxy amine adduct is from 1:10 to 10:1, preferably from 1:5 to 5:1, and most preferred from 1:3 to 3:1, and wherein the bismuth compound is prepared using acid in a quantity such that there are between 0.1 mol and less than 2 mol of dissociable protons per mole of bismuth.

The bismuth catalyst formulations according to the invention may be prepared in any desired manner, but are generally prepared by dissolving one or more basic bismuth compounds in an aqueous acid, and then adding a reaction product of at least one epoxide compound and at least one organic amine, the acid being employed in a quantity such that between 0.1 and less than 2 mol of dissociable protons are present per mole of bismuth ($Bi^{3+}$).

It is preferred to employ acids in a quantity such that there are between 0.2 and up to 1.5 mol, particularly preferably between 0.3 and up to 1.2 mol, of dissociable protons per mole of bismuth ($Bi^{3+}$).

Any basic bismuth compounds known in the art can be used. Also, mixtures of such compounds can be used. Examples of basic bismuth compounds which can be used in accordance with the invention include bismuth trioxide (also called dibismuth trioxide) $Bi_2O_3$, bismuth ortho-hydroxide $Bi(OH)_3$, and bismuthyl hydroxide $BiO(OH)$. Also suitable are basic bismuth nitrate $(BiO)NO_3$ and basic bismuth carbonate $(BiO)_2CO_3$. It is also possible to use mixtures of these compounds, in which case a minor proportion, for example, up to 50%, may be replaced by a neutral bismuth salt.

Acids which are suitable include any known acids or mixtures thereof, such as strong inorganic acids including sulfuric acid, nitric acid, and phosphoric acid. Although it is true that the hydrohalic acids also give rise to bismuth catalyst formulations in accordance with the invention, the presence of halide anions in the CED coat on an automobile body is preferably to be avoided because of the corrosive effect of halide ions. Preference is also given to organic acids such as carboxylic, sulfonic and phosphoric acids. Particularly preferred organic acids are those which contain one or more hydroxyl groups which are preferably in an $\alpha$-, $\beta$- or $\gamma$-position with respect to the acid group.

Other useful acids include the aliphatic hydroxycarboxylic acids such as lactic acid, tartaric acid, racemic acid, malic acid, hydroxymalonic acid, dihydroxysuccinic acid, trihydroxysuccinic acid, hydroxymethylmalonic acid, and the bishydroxyalkanecarboxylic acids such as bis(hydroxymethyl)propionic acid and bis(hydroxymethyl)malonic acid. Suitable aromatic hydroxycarboxylic acids include salicylic acid, 2-hydroxyterephthalic acid, 2-hydroxy-1-naphthoic acid and 3-hydroxy-2-naphthoic acid.

The epoxy-amine adducts which are suitable for the invention include any such adducts, such as water-dilutable amino-epoxy resins and carbonate-amine adducts, such as are described, for example, in DE 36 44 370 or EP 272 665, both of which are herein incorporated by reference. Such amino-epoxy resins generally have an amine number of from 30 to 200 (mg of KOH per g of solid resin), a hydroxyl number of from 50 to 500 (mg of KOH per g of solid resin) and a number-average molecular mass (Mn) of from 250 to 10,000 g/mol, preferably from 300 to 5,000 g/mol. The lower limit for the amine number preferably is 45, particularly preferably 70, while the upper limit preferably is 150, particularly preferably 100.

Examples of useful amino-epoxy resins include reaction products of epoxide-containing resins, preferably having terminal epoxide groups, selected from the groups of polyglycidyl ethers, polyglycidyl esters and polyglycidyl amines, with saturated and/or unsaturated secondary and/or primary amines and/or amino alcohols. These may be modified by at least one primary and/or secondary hydroxyl group, by a dialkyl amino group and/or by a primary amino group which temporarily is protected by ketimine formation.

Hydroxyl-containing amino-epoxy resins also are useful and advantageously are obtained from polyglycidyl ethers having preferably two 1,2-epoxide groups per molecule. Preferred polyglycidyl ethers are those of polyhydric mono- or polycyclic phenols which also may carry substituents on the aryl groups.

These polyglycidyl ethers generally have a number-average molecular mass (Mn) of from about 300 to 5,000 g/mol and a molecular mass divided by the number of epoxide groups (epoxide equivalent weight) of from about 170 to 2,500 g/mol. Examples of these include reaction products of epichlorohydrin or methylepichlorohydrin with dihydroxydiphenylmethane (bisphenol F) or dihydroxydiphenylpropane (bisphenol A), and with dihydroxybenzophenone, dihydroxynaphthalene and resorcinol. Polyepoxides of appropriate molecular mass are prepared either by selecting the molar ratios of bisphenol and epichlorohydrin or by reacting the monomeric diglycidyl compounds with further bisphenol with the addition of catalysts such as Lewis acids or phosphonium salts.

The epoxy resins also may be completely or partially hydrogenated. It also is possible to employ mixtures of epoxy resins of different structure and molecular mass. In addition, for the purpose of elastication, a portion of the aromatic polyglycidyl ethers can be replaced by aliphatic polyglycidyl ethers, whose diol components preferably are derived from polyether glycols based on ethylene oxide and propylene oxide or mixtures thereof. Branched polyether polyols also are possible for use in accordance with the invention, these compounds being formed when glycerol, trimethylol propane or penta-erythritol is used in the polymerization of the olefin oxides.

Examples of useful mixed epoxides include glycidyl ethers of bisphenol A and bisphenol F polypropylene glycol and polyethylene glycol ethers (with different molecular masses). The modified epoxy resins also can be modified by reaction with long-chain polyalcohols such as 1,6-hexanediol, neopentyl glycol, bisethoxylated neopentyl glycol, neopentyl glycol hydroxypivalate and bis (hydroxymethyl)cyclohexane, monoanhydropentaerythritol and polytetrahydrofurandiol, polycaprolactonediol, polycaprolactamdiol or polybutadienediol in the presence of suitable basic or acidic catalysts, such as boron fluoride-amine complexes. Whereas polyalcohols having primary OH groups can, given suitable catalysis, be reacted directly with polyglycidyl ethers, secondary OH groups are first reacted with diisocyanate. The NCO-terminated reaction product obtained then can be incorporated without difficulties as a bridge between 2 mol of polyglycidyl ether, with an increase in the molecular mass.

A detailed listing of suitable epoxide compounds can be found in the handbooks "Epoxidverbindungen und Harze" [Epoxide compounds and resins] by A. M. Paquin, Springer Verlag, Berlin 1958, Chapter iv and "Handbook of Epoxy Resins" by H. Lee, K. Neville, McGraw-Hill Book Company, New York, 1982 reissue, and "Epoxy Resin Chemistry and Technology" by C. A. May, Marcel Dekker Inc., New York and Basel 1988, each of which is hereby incorporated by reference.

The epoxy resin also can be modified with saturated or unsaturated polycarboxylic acids and/or hydroxyalkanecarboxylic acids. Examples of aliphatic, cycloaliphatic and/or aromatic polycarboxylic acids of various chain lengths are adipic acid, sebacic acid, fumaric acid, iso-phthalic acid and dimeric fatty acid. By hydroxyalkane-carboxylic acids are meant lactic acid, dimethylol-propionic acid or else carboxyl- and hydroxyl-containing polyesters. The reaction of excess polyglycidyl ether of low molecular mass with polycarboxylic acids and/or polyalcohols produces, as intermediate, modified polyglycidyl ethers which then are reacted further with amines and/or amino alcohols.

Heterocyclic polyepoxide compounds also can be used, such as 1,3-diglycidyl-5,5-dimethylhydantoin, triglycidyl isocyanurate or diepoxides of bisimides. Another suitable class of polyepoxides comprises polyglycidyl ethers of phenolic novolak resins, whereby the functionality can be raised from 2 to about 6 glycidyl groups per molecule. By defunctionalization with long-chain alkylphenols such as dodecylphenol, it is possible, additionally to incorporate elasticating elements. Moreover, polyglycidyl esters of polycarboxylic acids, such as diglycidyl hexahydrophthalate, diglycidyl tetrahydrophthalate or diglycidyl fumarate, can be used.

The amino groups are introduced into the epoxy, for example, either by addition of NH-reactive compounds onto the epoxide group or by reaction of the hydroxyl groups of the base resin with basic monoisocyanates, which are formed by reacting aromatic and/or aliphatic and/or cycloaliphatic di- or polyisocyanates with a dialkylaminoalkanol (cf. DE-A-27 07 405, which is hereby incorporated by reference).

As NH-reactive compounds, aliphatic linear or branched amines are useful. Primary amines are suitable, such as methylamine, ethylamine, propylamine, butylamine, octylamine, monoethanolamine, 2-ethylhexylamine, dimethylaminopropylamine, diethylaminoethylamine, dimethylaminoneopentylamine or methoxypropylamine. Secondary amines are preferred, such as dialkylamines, monoalkylhydroxyalkylamines and dihydroxyalkylamines. Examples of such compounds are dimethylamine, diethylamine, dipropylamine, dibutylamine, methylbutylamine, dimethylaminopropylamine, N-methylaminoethanol or diethanolamine or else cyclic amines, such as morpholine or oxazolidine. When primary amines are used the amine reacts, depending on the stoichiometric ratios which are available, with from 1 to 2 epoxide groups, with enlargement of the molecule.

It also is possible to employ primary amines and secondary polyoxyalkylene-mono- and diamines. Examples of such monoamines include ethanolamine, propanolamine, butanolamine, ethylene glycol 2-aminoethyl ether ($H_2N-CH_2-CH_2-O-CH_2-CH_2-OH$) and diethylene glycol mono(3-aminopropyl) ether ($H_2N-(CH_2)_3-O-CH_2-CH_2-O-CH_2-CH_2-OH$). When primary amines are employed, the amine reacts with the epoxide group, depending on the stoichiometric ratios available, with enlargement of the molecule. Examples of commercially available amines of this type are: Jeffamine® M series, Jeffamine® D series and Jeffamine® ED series.

Also suitable are di- or triamines containing primary and/or secondary amino groups, for example, laurylpropylenediamine and tallow-fatty-propylenediamine.

With secondary diamines, chain extension occurs. The secondary diamines used are preferably long-chain diamines and are N,N'-dialkyldiaminoalkanes such as, for example, N,N'-bis(isohexyl)-1,6-diaminohexane, N,N'-bis(isohexyl) isophoronediamine, N,N'-bis(isohexyl)dimethylhexamethylenediamine, N,N'-bis(isohexyl)-2-methyl-pentamethylenediamine, N,N'-bis(isohexyl) ethylenediamine and N,N'-bis(isohexyl)di(4-aminocyclohexyl)methane or reaction products of saturated glycidyl ethers or glycidyl esters or epoxyalkanes with primary diamino-alkanes, such as the addition product of 1,6-hexane-diamine or 2-methylpentamethylenediamine with 2 mol of a glycidyl ester of Versatic acid (α-branched mono-carboxylic acids having 9 to 11 carbon atoms).

Monoepoxides which can be employed for this purpose also are saturated or unsaturated glycidyl ethers or α-epoxides of various chain lengths, such as dodecane 1,2-oxide or butylene oxide. The appropriate number of hydroxyl groups comes about on the one hand automatically from the epoxide group during the addition of the secondary amino groups, while on the other hand it can be controlled by the use of hydroxyalkylamines. In addition, as secondary diamines, it is possible to employ the reaction product of 2 mol of 2-ethylhexylamine with 1 mol of Beckopox® EP 075 (diglycidyl ether based on propylene oxide) and/or 1 mol of Beckopox® EP 140 (diglycidyl ether based on bisphenol), and also aliphatic secondary diamines based on propylene oxide adducts of diols or triols, for example, Novamin® grades.

The molar ratios between compounds containing epoxide and amino groups are to be selected such that the complete incorporation of the amine is ensured, since otherwise rupture-like surface defects may occur in the course of electrophoretic coating; in other words, a slight excess of epoxide groups is advantageous.

It is possible to react all of the amines simultaneously with the epoxide groups, or else a stepwise procedure can be followed. The reaction of the amines begins even at room temperature and is generally exothermic. In order to achieve complete reaction it is generally necessary to raise the temperature temporarily to from about 50° to 120° C.

For the preparation of the amino-epoxy resin, an advantageous procedure is one in which the epoxy resin is first dissolved in a solvent and then this solution is reacted with the amines. In a particularly preferred preparation variant, the dissolved epoxy resins are metered into a mixture of the corresponding amines, bisphenol A and solvent.

For the preparation of the bismuth catalyst, a preferred procedure in accordance with the invention is to heat a mixture of the basic bismuth compound with the acid component and water at a temperature of between, for example, 60° and 100° C., with stirring. After the bismuth compound has dissolved completely, an epoxy-amine adduct, if desired in solution, and also, if desired, a further quantity of water, are added in order to adjust the solids content to, for example, from 30 to 60% of the overall mass. The mixture is cooled and then filtered, for example, using a deep-bed filter, in order to remove particles with a size greater than 10 μm. A solution is obtained which exhibits a slight Tyndall effect. No precipitate is observed on storage for up to three months.

The catalyst solution can be added to a CED bath liquid without any significant alteration in the pH thereof. The catalyst solution is added in a quantity such that the content by mass of bismuth in the CED bath is sufficient to effect the desired curing, for example, between 0.2 and 5%, based on the overall mass of solids in the CED bath.

The catalytic activity for the curing of the CED coat is the same as that of the conventionally used lead compounds and tin compounds. The corrosion-preventing effect corresponds to that of lead-containing catalyst formulations.

The bismuth catalysts also can be used for other cationic coating systems which are curable by transurethanization, transesterification and/or transamidation. The coating system can be applied to any desired substrate.

The examples which follow illustrate the advantages of the invention. The examples are for illustrative proposes only and do not limit the scope of the invention.

EXAMPLES:

Example 1: Preparation of the catalyst

A mixture of 93.2 g of dibismuth trioxide ($Bi_2O_3$), 60 g of dimethylolpropionic acid (DMPA) and 164.2 g of deionized water (DW) is heated to 80° C. After 2 hours, 200 g of an epoxy-amine adduct corresponding to DE-P 44 13 059.7 (U.S. application filed on Apr. 5, 1995, serial number not yet assigned) Example 3 which is hereby incorporated by reference, as a 55% strength solution in methoxypropanol, and 120 g of deionized water are added. Thirty minutes later the mixture is cooled and filtered using a 10 μm deep bed filter. A stable, slightly colloidal solution is obtained which has the following characteristics: solids content: 41%, acid content: 70 mmol/100 g of solution, and bismuth content by mass: 13%.

Comparison Example 1:

A mixture of 93.2 g of $Bi_2O_3$, 120 g of DMPA and 422.2 g of DW is heated to 80° C. and held for 2 hours. The clear solution is cooled and filtered using a 10 μm deep bed filter. A solution is obtained which has a bismuth content by mass of 13% and an acid content of 140.8 mmol/100 g of solution. Overnight the solution deposits a white precipitate which cannot be redissolved.

Comparison Example 2:

A mixture of 93.2 g of $Bi_2O_3$, 161 g of DMPA and 381.2 g of DW is heated to 80° C. and held for 2 hours. The clear solution is cooled and filtered using a 10 μm deep bed filter to give a storage-stable colloidal bismuth which has the following characteristics: bismuth content by mass: 13%, solids content: 40%, and acid content: 189 mmol/100 g of solution.

Example 2: Preparation of a CED bath liquid and results of deposition:

1.2% of the bismuth colloid according to Example 1 or Comparison Example 2 is added to a CED bath comprising 30% by weight of a binder dispersion according to EP-B-0 000 086, Example 31, and 10 % by weight of catalyst-free pigment paste according to EP-A-0 569 842, Example 2.1, and water is added to a total of 100%. Both of these EP documents are incorporated by reference in their entireties. The coating formulations are subjected to cataphoretic deposition in an open glass vessel. The cathode comprises phosphatized steel panels and the anode, at a distance of from 5 to 10 cm from the cathode, a bright steel panel. The bath temperature is 32° C. and the period of deposition is 2 minutes. Stirring is effected by means of a PTFE-coated magnetic stirrer rod.

The voltages applied, the film thicknesses obtained and the properties of the deposited and subsequently cured films (period of baking 20 min, oven temperature 170° C.) in each case are shown in the following table:

While the invention has been described with reference to certain embodiments, numerous modifications, alterations, and changes to the embodiments are possible without departing from the spirit and scope of the invention.

What is claimed is:

1. A composition which is useful as a catalyst for the curing of cataphoretic deposition coating materials, which comprises an epoxy-amine adduct, and a water-soluble bismuth compound, wherein the ratio of the number of bismuth atoms to the number of β-hydroxy amine groups in the epoxy amine adduct is from 1:10 to 10:1, and wherein the composition is prepared by dissolving a basic bismuth compound in an aqueous acid, which acid is employed in a quantity such that there are between 0.1 mol and less than 2 mol of dissociable protons per mole of bismuth, and then adding thereto a reaction product of at least one epoxide and at least one organic amine as the epoxy-amine adduct, and wherein the composition is free of lead compounds and tin compounds.

2. A composition as claimed in claim 1, wherein the ratio of the number of β-hydroxy secondary amine groups to the number of bismuth atoms is from 1:5 to 5:1.

3. A composition as claimed in claim 1, wherein the acid is employed in a quantity such that there are between 0.2 and less than 1.5 mol of dissociable protons per mole of bismuth.

4. A composition as claimed in claim 1, wherein the acid is employed in a quantity such that there are between 0.3 and less than 1.2 mol of dissociable protons per mole of bismuth.

5. A composition as claimed in claim 1, wherein the basic bismuth compound comprises one or more of bismuth trioxide, bismuth ortho-hydroxide, bismuthyl hydroxide, bismuth nitrate, or bismuth carbonate.

6. A process for the preparation of a composition which comprises a bismuth compound and is useful as a catalyst for the curing of cataphoretic deposition coating materials, comprising:

TABLE 1

|  | Units | Addition of the bismuth colloid according to Example 1 | Addition of the bismuth colloid according to Comparison Example 2 |
| --- | --- | --- | --- |
| Coat thickness at 225 V | μm | 12.5 | 7.5 |
| Coat thickness at 250 V | μm | 14.5 | 9 |
| Coat thickness at 275 V | μm | 16.5 | 11 |
| Coat thickness at 300 V | μm | 19 | 14 |
| Breakdown voltage | V | 325 | 325 |
| Surface roughness (height root mean square value) | μm | 0.28 | 0.55 |
| Acetone resistance | s | >60 | >60 |
| Adjustment with Texanol to obtain a coat thickness of 20 μm | % | 0.2 | 0.7 |
| Throwing power: |  |  |  |
| Exterior coat thickness | μm | 20 | 19 |
| Interior extent of reach | cm | 17 | 14 |
| 7 μm limit | cm | 10 | 7.5 |

The advantages of the bismuth catalyst according to the invention over a bismuth catalyst of the prior art are evident from the improved values for coat thickness: greater at the same deposition voltage levelness, surface roughness: half the peak-to-valley ratio (height root mean square)

throwing power: the coating within cavities is markedly improved.

dissolving one or more basic bismuth compounds in an aqueous acid, and adding thereto a reaction product of at least one epoxide compound and at least one organic amine, wherein the acid is employed in a quantity such that between 0.1 and less than 2 mol of dissociable protons are present per mole of bismuth, whereby a composition comprising the bismuth compound and an epoxy amine adduct and free of lead compounds and tin compounds results.

7. A process as claimed in claim 6, wherein the bismuth compound comprises one or more of bismuth trioxide, bismuth ortho-hydroxide, bismuthyl hydroxide, bismuth nitrate, or bismuth carbonate.

8. A process as claimed in claim 6, wherein the acid comprises one or more organic acids, each of which carries at least one alcoholic hydroxyl group.

9. A process as claimed in claim 6, wherein the acid comprises one or more organic hydroxycarboxylic acids.

10. A process as claimed in claim 6, wherein the acid comprises at least one bishydroxyalkanecarboxylic acid.

11. A process as claimed in claim 6, wherein the basic bismuth compound comprises an oxide or hydroxide of trivalent bismuth.

12. A process as claimed in claim 7, wherein the reaction product of epoxide and organic amine is obtained by reacting a compound having at least two epoxide groups with a compound having at least one primary amino group and at least one further primary or secondary amino group.

13. A composition useful for the curing of cataphoretic coating materials which is obtained by a process of claim 6.

14. A cataphoretic deposition coating formulation comprising a composition prepared as claimed in claim 6.

15. A substrate coated with a coating formulation as claimed in claim 14.

16. A process as claimed in claim 6, wherein the acid is not a hydrohalic acid.

17. A process for the preparation of a composition comprising:

dissolving one or more basic bismuth compounds in an aqueous acid, and adding thereto a reaction product of at least one epoxide compound and at least one organic amine, wherein the acid is employed in a quantity such that between 0.1 and less than 2 mol of dissociable protons are present per mole of bismuth, thereby producing a composition comprising the bismuth compound and an epoxy amine adduct.

18. A process as claimed in claim 17, wherein the dissolving step takes place in the absence of the reaction product of the at least one epoxide compound and at least one organic amine.

* * * * *